US008805723B2

United States Patent
Glitsch et al.

(10) Patent No.: US 8,805,723 B2
(45) Date of Patent: Aug. 12, 2014

(54) ACOUSTICALLY TRANSMITTING A RESOURCE IDENTIFIER IN MULTIPLE CONCURRENT SEGMENTS

(75) Inventors: Hans M. Glitsch, Quilcene, CA (US); Ajay Shah, Orange, CA (US)

(73) Assignee: iViu Technologies, LLC, Anaheim, CA (US)

( * ) Notice: Subject to any disclaimer, the term of this patent is extended or adjusted under 35 U.S.C. 154(b) by 779 days.

(21) Appl. No.: 12/789,419

(22) Filed: May 27, 2010

(65) Prior Publication Data

US 2010/0305730 A1    Dec. 2, 2010

Related U.S. Application Data

(60) Provisional application No. 61/181,472, filed on May 27, 2009.

(51) Int. Cl.
*G06Q 30/00* (2012.01)
*H04L 27/14* (2006.01)

(52) U.S. Cl.
USPC ...................................... 705/14.58; 375/335

(58) Field of Classification Search
USPC .............. 340/12.25, 12.26; 705/14.58, 14.65; 709/203; 375/235, 274, 304, 335, 336
See application file for complete search history.

(56) References Cited

U.S. PATENT DOCUMENTS

| 6,834,308 | B1 | 12/2004 | Ikezoye et al. |
| 7,505,823 | B1 | 3/2009 | Bartlett et al. |
| 2003/0036408 | A1 | 2/2003 | Johansson et al. |
| 2005/0010787 | A1 | 1/2005 | Tarbouriech |
| 2009/0051496 | A1* | 2/2009 | Pahlavan et al. ............. 340/10.2 |
| 2009/0070104 | A1 | 3/2009 | Jones et al. |
| 2009/0082100 | A1 | 3/2009 | Zalewski |
| 2009/0175499 | A1 | 7/2009 | Rosenblatt |
| 2012/0213383 | A1 | 8/2012 | Glitsch et al. |

FOREIGN PATENT DOCUMENTS

WO    WO-2010013877 A1    12/2010

OTHER PUBLICATIONS

Gerasimov V., and Bender W., "Things that talk: using sound for device-to-device and device-to-human communication," IBM Systems Journal, vol. 39, Nos. 3 & 4, pp. 530-546, Dec. 2000.*
"PCT/US10/36493, ISR & WO,", Sep. 16, 2010 , all.
"U.S. Appl. No. 13/459,497, Non-Final Office Action mailed Aug. 17, 2012", , 6.
"U.S. Appl. No. 13/459,497 Final Office Action mailed Apr. 9, 2013", 11 pages.
"TV Station Market Trial Overview", Sep. 9, 2008 , all.
"What is BlabBlab Live.tv.chat", Feb. 4, 2009 , all.

* cited by examiner

*Primary Examiner* — Duc Nguyen
*Assistant Examiner* — Kile Blair
(74) *Attorney, Agent, or Firm* — Strategic Patents, P.C.

(57) ABSTRACT

A plurality of audio signals are broadcasted concurrently on a plurality of substantially separate audio channels. Each of the audio channels has a center frequency greater than approximately 16 kHz. Broadcasting the audio signals causes one or more clients to automatically retrieve a resource from a resource location. The plurality of audio signals collectively encode a resource identifier that describes the resource location.

15 Claims, 4 Drawing Sheets

ACOUSTICALLY TRANSMITTING A RESOURCE IDENTIFIER IN MULTIPLE CONCURRENT SEGMENTS

RELATED APPLICATIONS

This application claims the benefit of U.S. Prov. App. No. 61/181,472, filed on May 27, 2009, the entire content of which is hereby incorporated by reference.

TECHNICAL FIELD

This disclosure relates automatic resource retrieval and use. More specifically, this disclosure relates to generating, providing, and processing cues for resource retrieval and use.

BACKGROUND

Computers and other computing devices are useful for retrieving and displaying resources such as multimedia content, interactive content, executable programs, and the like. Such resources are often useful in providing information to a user of the computer. Often, that content can augment or enhance other information, performances, or experiences that the user is presented with from a source other than his computer.

SUMMARY

In general, in one aspect, broadcasting a plurality of audio signals concurrently on a plurality of substantially separate audio channels, each of the audio channels having a center frequency being greater than approximately 16 kHz, thereby causing one or more clients to automatically retrieve a resource from a resource location, wherein the plurality of audio signals collectively encode a resource identifier that describes the resource location.

Implementations may include one or more of the following features: The resource includes multimedia content. The resource includes source code or executable code. The resource location includes a Uniform Resource Locator. The resource location includes an Internet Protocol address. The resource location includes a path on a storage medium. The resource location includes a memory address. Each of the audio channels has a center frequency greater than 16 kHz. The plurality of audio channels are separate. Also performing the steps of receiving the resource identifier; segmenting the identifier into a plurality of parts; and encoding each one of the plurality of parts, thereby producing the plurality of audio signals. Encoding includes encoding using a Gaussian Minimum Shift Keying technique. Also performing the steps of identifying a minimum channel size and a total usable bandwidth, wherein the identifier is segmented into a number of parts equal to the total usable bandwidth divided by the minimum channel size. The identifier is segmented into three parts. The resource identifier includes an integer between 0 and $2^{30}$. The resource identifier consists of an integer between 0 and $2^{30}$.

In general, in another aspect: receiving a resource identifier; segmenting the identifier into a plurality of parts; encoding each one of the plurality of parts, thereby producing a plurality of encoded signals; modulating each one of the plurality of encoded signals onto a plurality of audio channels, each one of the plurality audio channels having a center frequency greater than about 16 kHz and each one of the plurality of audio channels having a center frequency substantially different from each other one of the plurality of audio channels; and broadcasting the plurality of encoded signals concurrently on the plurality of audio channels.

Implementations may include one or more of the following features: Also performing the steps of receiving and decoding the resource identifier. Each one of the plurality audio channels having a center frequency separated from each other one of the plurality of channels by at least 1.5 kHz. Broadcasting includes transmitting from a presenter to an audience at a presentation. Broadcasting includes transmitting from a location in a retail venue. Broadcasting includes transmitting over an audio system at a sports venue. Broadcasting includes transmitting from an exhibit at a museum.

In general, in another aspect: receiving a signal concurrently on a plurality of audio channels, each audio channel having a center frequency greater than approximately 16 kHz; decoding the signal, thereby producing a resource identifier; identifying a resource location based on the resource identifier; obtaining a resource from the resource location.

Implementations may include one or more of the following features: The signal is received concurrently on three audio channels. The resource identifier includes an integer between 0 and $2^{30}$. The resource identifier consists of an integer between 0 and $2^{30}$. Decoding the signal includes using a Gaussian Minimum Shift Keying technique. Identifying a resource location includes using the resource identifier as a query to a database and receiving a resource location as a result of the query. Identifying a resource location includes looking up a resource location in a table. Identifying a resource location includes translating the resource identifier into a resource location, said translating being carried out on a local machine. The resource includes multimedia content. The resource includes source code or executable code.

In general, in another aspect: receiving a resource location; assigning the resource location to a corresponding resource identifier such that distinct resource locations are assigned distinct resource identifiers; encoding the resource identifier into a plurality of audio signals, said audio signals suitable for concurrent transmission across a plurality of substantially separate audio channels, each channel having a center frequency above approximately 16 kHz. The resource location includes a Uniform Resource Locator. The resource location includes an Internet Protocol address. The resource location includes a path on a storage medium. The resource location includes a memory address. The resource identifier includes an integer from 0 to $2^{30}$. The resource identifier consists of an integer from 0 to $2^{30}$.

Implementations may include one or more of the following features: The audio signals are orthogonal. Encoding the resource identifier includes using a Gaussian Minimum Shift Keying technique. Encoding the resource identifier into an audio signal includes segmenting the resource identifier into a plurality of parts. Also performing the steps of identifying a minimum channel size and a total usable bandwidth, wherein the identifier is segmented into a number of parts equal to the total usable bandwidth divided by the minimum channel size. The resource identifier is segmented into three parts.

In general, in another aspect: receiving a content acquisition cue, the content acquisition cue including a context identifier; in response to the content acquisition cue, obtaining content associated with the context identifier from a remote source; storing the content at a local data store after receiving the content acquisition cue, receiving a content use cue; and in response to the content use cue, loading the content from the local data store.

Implementations may include one or more of the following features: Also performing the steps of decoding the content acquisition cue using a Gaussian Minimum Shift Keying technique. Also performing the steps of querying a database using the context identifier, and in response to the querying, obtaining a resource identifier describing the location of the content. The resource identifier corresponds to a Uniform Resource Locator. The resource identifier corresponds to an Internet Protocol address. The resource identifier corresponds to a path on a storage medium. The content acquisition cue includes a plurality of audio signals broadcast on a plurality of substantially separate audio channels, each audio channel having a center frequency above approximately 16 kHz. The audio channels are separate. Each audio channel has a center frequency above 16 kHz. The context identifier corresponds to a physical location. The context includes a presentation, and the content includes supporting materials for one or more speakers. The context includes a retail outlet, and the content includes advertisements for one or more products in the retail outlet. The content includes a map of the physical location. The content includes emergency procedures corresponding to the physical location.

Other aspects include other combinations of the features recited above and other features, expressed as methods, apparatus, systems, program products, and in other ways. Other features and advantages will be apparent from the description and from the claims.

DESCRIPTION OF DRAWINGS

Embodiments of the invention described herein may be understood by reference to the following figures, which are provided by way of example and not of limitation.

DETAILED DESCRIPTION

Computing devices (including personal computers, laptops, netbooks, smart phones, special-purpose computing hardware, and other portable or non-portable equipment, collectively referred to in this document as "computers") are useful for retrieving information. For example, computers often can electronically communicate (e.g., via the Internet) with a vast number of information sources, and can therefore retrieve a vast amount of information.

Moreover, computers are capable of displaying a vast amount of information in a variety of forms. Even computers with relatively modest capabilities can routinely display a variety of video, audio, document, and other data formats, and can similarly execute a wide variety of computer programs.

It is often useful or entertaining to employ these capabilities of a computer to enhance events that are occurring in the computer user's environment. For example, if the computer user is attending a presentation on a topic, it may enhance the user's experience of the presentation if the user was simultaneously viewing pertinent content, e.g., on his computer.

To some degree, this may be accomplished by traditional means. For example, the speaker at a presentation can display a visual aid to the audience. However, this does not allow audience members to individually interact with the visual aid. Alternatively, the speaker may disseminate an electronic copy of the visual aid to conference attendants in advance of the presentation. Although this allows audience members to individually interact with the visual aid, it is relatively difficult to focus the audience's collective attention on a desired feature of the visual aid. For example, if the speaker desired audience members to activate a function on a program by clicking on one of many available buttons, the speaker's options would be relatively inefficient. For example, one option is for the speaker to attempt to verbally describe which of the several buttons to click.

Among other things, the techniques described in this document allow for the automatic retrieval and/or use of content or other resources. These techniques may advantageously be employed, e.g., by a speaker at a conference to cause the participants' computers to automatically retrieve, load, or use content or other resources. Other exemplary uses are discusses below.

Figure 1:
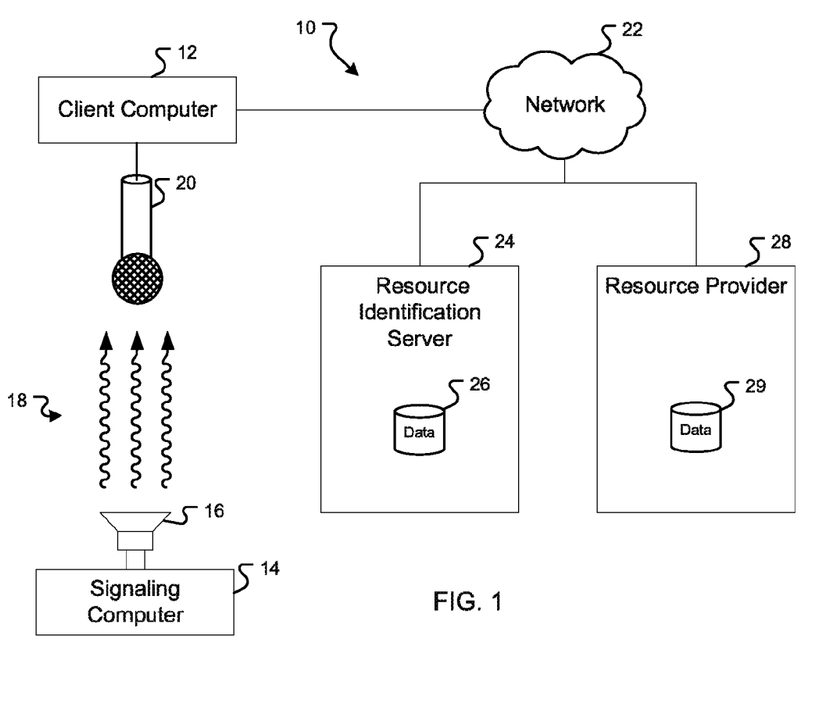
FIG. 1 is schematic depiction of a resource retrieval system.

FIG. 1 is a schematic depiction of a resource retrieval system. The resource retrieval system 10 may include one or more client computers 12 and a signaling computer 14. The signaling computer 14 may include a loudspeaker 16, and each of the client computers 12 may include a microphone 20. Each client computer 12 may also be in data communication via a computer network 22 to one or more resource identification servers 24 and resource providers 28. The computer network 22 can include any known networking type or structure, including local area networks, ad-hoc networks, mesh networks, wide-area networks such as the Internet, telephone networks, satellite networks, etc. The data communication may be implemented in any known fashion, including hypertext transfer protocol (HTTP), file transfer protocol (FTP), BitTorrent protocol, e-mail, short message service (SMS), or any other standard or proprietary fashion.

The client computer 12 may more generally include any computing device that includes a microphone, networking communications capability, and processing capability adequate for the signal processing described herein. By way of example and not limitation, a client computer 12 as described herein may include a laptop computer, a notebook computer, a netbook computer, a cellular phone (including smart phones such as an iPhone or a Blackberry), a personal digital device, a media player (e.g., an iPod), an electronic messaging device, and so forth.

As described more thoroughly below, the presenter may emit suitable audio signals 18 using the loudspeaker 16, which can subsequently be detected by the microphone 20 of a client computer 12. The audio signal 18 can be decoded to reveal a resource identifier. As described more fully below, the resource identifier can consist of a relatively small amount of data; e.g., a 30 bit integer.

The resource identifier can be used to determine a corresponding resource location. For example, this can be accomplished by submitting the resource identifier over the computer network 22 to a resource identification server 24. A server 24 can include a data store 26 that lists a resource location corresponding to each resource identifier. The client computer 12 can then obtain the resource from a resource provider 28 at the specified resource location.

As used in this document, the word "resource" can refer to any computer-stored information or instructions that can be transferred, described, or implemented over a computer network. In particular, a "resource" can include audio, video, images, documents, markup language documents, hypertext links, scripts, macros, source code, executable code, or any combinations of the foregoing. The words "content" and "resource" are synonymous in this document.

Figure 2:
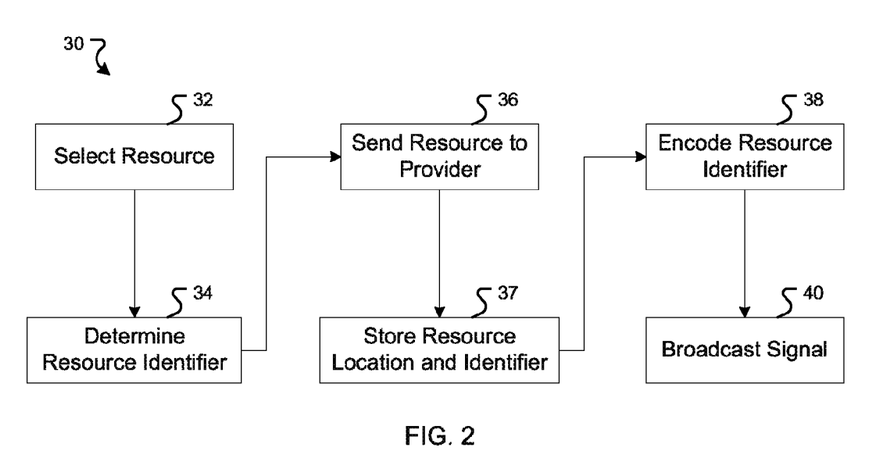
FIGS. 2-3 are flowcharts for a resource retrieval method.

FIG. 2 is a method of associating an audio signal with a resource. The method 30 begins by selecting a resource (step 32) with which to associate an audio signal 18. For example, this resource can include a visual aid for use by a speaker during a presentation. Many more examples are given below.

In step 34, a resource identifier can be associated with the resource. In some implementations, the resource identifier can consist solely of a number; for example, a 30 (or fewer) bit number. Additionally, a resource identifier can also include other information, such as information that describes a context or a geographic location in which the resource will be used. Further considerations pertinent to selecting a resource identifier are discussed in connection with FIGS. 6A and 6B.

Step 34 can be carried out at any location, on any computer. For example, step 34 can be carried out at the signaling computer 14, a resource identification server 24, a resource provider 28, or at another location outside the resource retrieval system 10.

In step 36, the resource is sent to known location at a resource provider 28. In some implementations, this can be done via any electronic communication, such as file transfer protocol, secure copying, via e-mail attachment, etc. In some implementations, the performer of the method 30 is also the resource provider 28, in which case the resource need not be sent to another location.

In step 37, the resource identifier and the location of the corresponding resource are stored in a data store 26 within a server 24. This information can be stored in any manner. For example, the resource identifier and resource location can be stored in corresponding fields in a record of a database, as corresponding entries in an index or table, as concurrent entries in a list, etc.

In step 38, the resource identifier can be encoded as an audio signal 18. Further details about possible encoding techniques are described below in connection with FIGS. 4 and 5. The encoding can take place at any location on any computer. For example, step 38 can be carried out at the signaling computer 14, a server 24, a resource provider 28, or at another location outside the resource retrieval system 10.

In step 40, the audio signal 18 can be broadcasted. In some implementations, the audio signal 18 is broadcasted by the signaling computer 14 using the loudspeaker 16, or other hardware capable of broadcasting an audio signal. In some implementations, a computer different from the signaling computer 14 broadcasts the audio signal.

Figure 3:
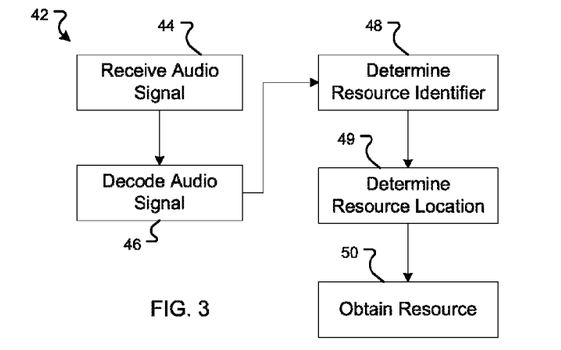

FIG. 3 is a method for retrieving a resource. The method 42 of FIG. 3 can begin with receiving an audio signal (step 44). For example, an audio signal 18 that had previously been broadcasted using the method 30 or another method can be received.

In step 46, the audio signal can be decoded. Further details about decoding techniques are described below, in connection with FIG. 7. As a result of the decoding in step 46, a resource identifier can be obtained (step 48).

In step 49, a resource location can be ascertained based on the resource identifier. For example, the resource identifier can be submitted to a server 24, in response to which the server 24 provides the corresponding resource location. In some implementations, the resource identifier can be used as a query for a database, as an argument for a lookup routine, etc.

In step 50, the resource can be obtained from the resource location. In some implementations, the resource can be obtained directly by the performer of the retrieval method 42, such as a client computer 12. For example, the client computer 12 can initiate a data connection to the resource location and obtain the resource. In some implementations, the performer of the retrieval method 42 can indirectly obtain the resource. For example, the resource provider can send the resource as an attachment in an e-mail to an e-mail server, from which the performer of the method 42 subsequently obtains the resource.

After obtaining the resource, the client computer 12 may take a specified action with respect to the resource (e.g., display or execute the resource), or may simply store the resource for later use. Although the resource provider 28 is illustrated separately from the client computer 12 in FIG. 1, in some implementations the resource provider 28 can be the same as the client computer 12. In this case, the resource is "local" to the client computer 12.

Figure 4:
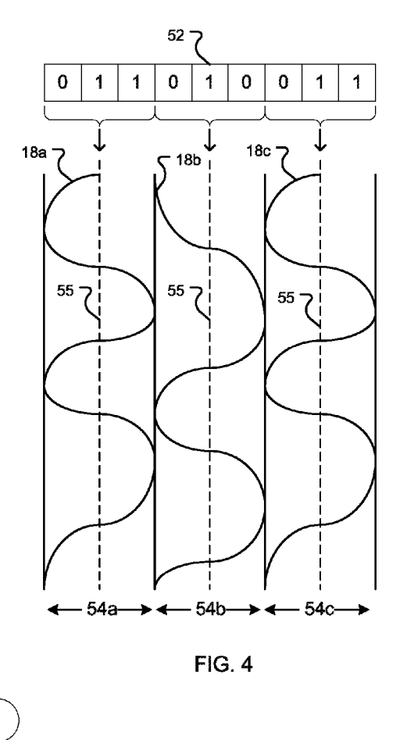
FIG. 4 is a schematic depiction of an encoding process.
Figure 5:
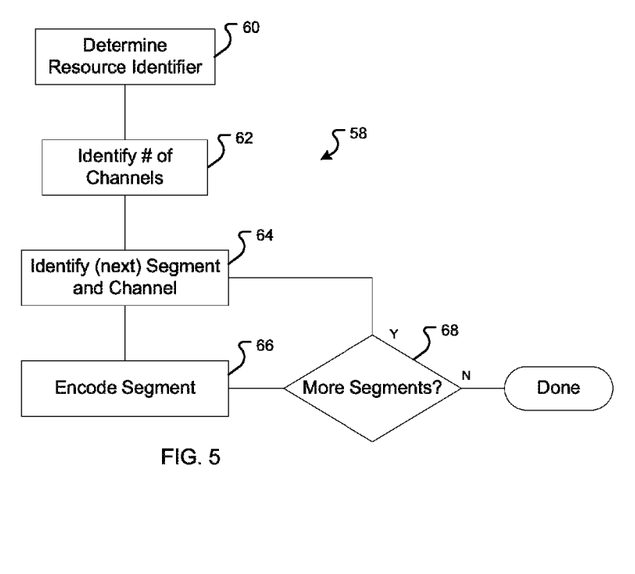
FIG. 5 is a flowchart for encoding a resource identifier

Referring to FIGS. 4 and 5, a schematic illustration of encoding a resource identifier 52 is shown (FIG. 4), together with a method 58 of encoding a resource identifier (FIG. 5). In the schematic illustration, a resource identifier 52 is illustrated as a string of bits. Although only nine bits are illustrated in FIG. 4, in principal any number of bits can be used, subject to limitations discussed below. In step 60, the resource identifier 52 can be obtained. For example, this can be the result of step 34 of process 30 (FIG. 2).

In step 62, a number of audio channels 54 are identified. Although three audio channels 54a, 54b, and 54c are illustrated in FIG. 4, in principal any number of audio channels can be used. An audio channel is characterized by a central frequency 55 and a channel width (or "band width") that describes the range of frequencies in the channel. The channel width is illustrated in FIG. 4 by the geometric width of the channels 54a, 54b, 54c.

If the audio channels 54a, 54b, 54c do not overlap (i.e., are separate), then there is no interference between the audio signals sent over the audio channels. However, if the audio channels 54a, 54b, 54c do overlap, then the audio signals may, but need not, interfere. In some implementations, the audio channels 54a, 54b, and 54c are separate. In some implementations, one or more pairs of audio channels 54a, 54b, and 54c are only substantially separate, with a small amount of overlap permissible based on an acceptable level of interference-based errors. The rate at which these errors occurs depends on many factors, including the size of the overlap between channels, the type of encoding used, the data being sent during a particular transmission, and other factors.

As discussed below, some encoding techniques require a minimum bandwidth for a communication channel 54. In some implementations, the number of audio channels 54 can be chosen by identifying a total frequency range available for transmission, and partitioning the available frequency range into separate (or substantially separate) channels of the minimum-sized bandwidth necessary for the selected encoding technique. This approach maximizes the number of audio channels 54 available for transmission.

In principle, there is no upper limit for the total frequency range available for transmission. However, the sampling rate of the microphone 20 can determine the maximum possible frequency it can receive. In particular, the maximum possible identifiable frequency is equal to half the sampling rate. In some implementations, commonly available microphones have a sampling rate of 44.1 kilo-samples per second. Consequently, the maximum available frequency such a microphone can detect is 22.05 kHz.

In principle, there is no lower limit for the total frequency range available for transmission. However, in some implementations, it is desirable for the audio signals 18 to be inaudible to humans or other animals. This has the advantage that people would not be distracted by audio signals 18 that are broadcast in their vicinity. According to one estimate, the audible range for most humans has an upper limit of 15 kHz. This, in turn, can be used as a lower limit of the total available frequency range.

Once the number of channels 54 is identified in step 62, the resource identifier 52 can be segmented into as many parts as there are channels (step 64). For example, in FIG. 4, the nine-bit resource identifier 52 is segmented into three parts, one for each of the communication channels 54a, 54b, 54c. If the number of bits in the resource identifier 52 is not evenly divisible by the number of communication channels 54, then the remainder bits can be associated with the higher-frequency channels. This can be advantageous for reasons of echo prevention, described more fully below (see FIGS. 6A and 6B).

After segmenting the resource identifier 52, each segment can be processed as follows. A first segment is identified (step 64). That segment is encoded according to a chosen algorithm (step 66). There are a number of modulation algorithms that can be employed, including analog modulation, digital modulation, spread spectrum modulation, and others. Each algorithm has potential strengths and weaknesses, depending on the particular constraints that are important in the deployment of a particular resource retrieval system 10.

Among the possible encoding techniques is the class of continuous spectrum, frequency shift keying algorithms. One such algorithm, known as Gaussian minimum shift keying ("GMSK"), has the advantageous property of requiring a relatively narrow bandwidth, e.g., approximately 1.5 kHz) for each of three audio channels to transmit about ten bits (or thirty bits in aggregate) within two to five milliseconds (without any cyclic redundancy check). Consequently, using GMSK for encoding accommodates a relatively high number of audio channels 54 that can be used for transmission. It will be understood that other modulation techniques may be suitably adapted to encode data for high-frequency audio transmission. Thus, while GMSK has been usefully demonstrated to provide adequate data rates and robustness in a variety of physical contexts, this disclosure is not limited to GMSK coding unless explicitly stated to the contrary. For example, other shift-keyed encoding techniques include minimum shift keying, frequency shift keying, phase shift keying, quadrature phase shift keying, and so forth. Still more generally, other modulation techniques based upon frequency modulation, amplitude modulation, phase modulation, and various combinations of the foregoing, are generally known in the art and all such techniques that may be usefully adapted to reliably encode data onto a high-frequency audio carrier are intended to fall within the scope of this disclosure.

Figure 6A:
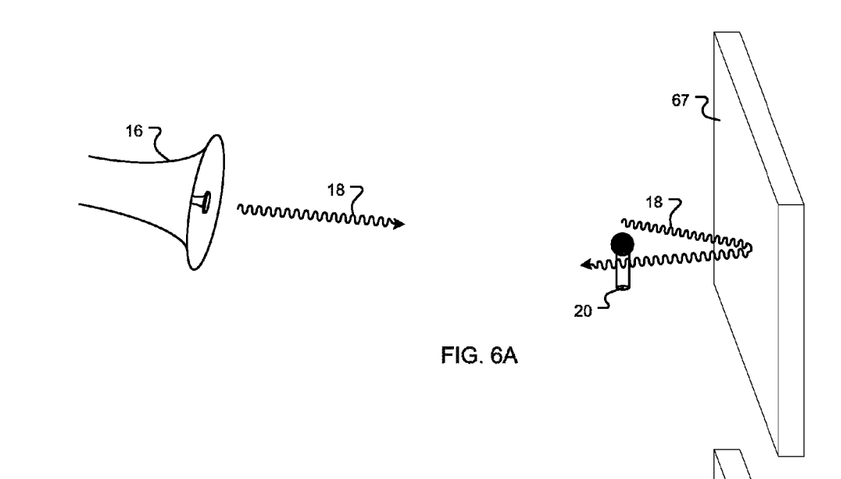
FIGS. 6A and 6B are schematic depictions of broadcasting an audio signal.
Figure 6B:
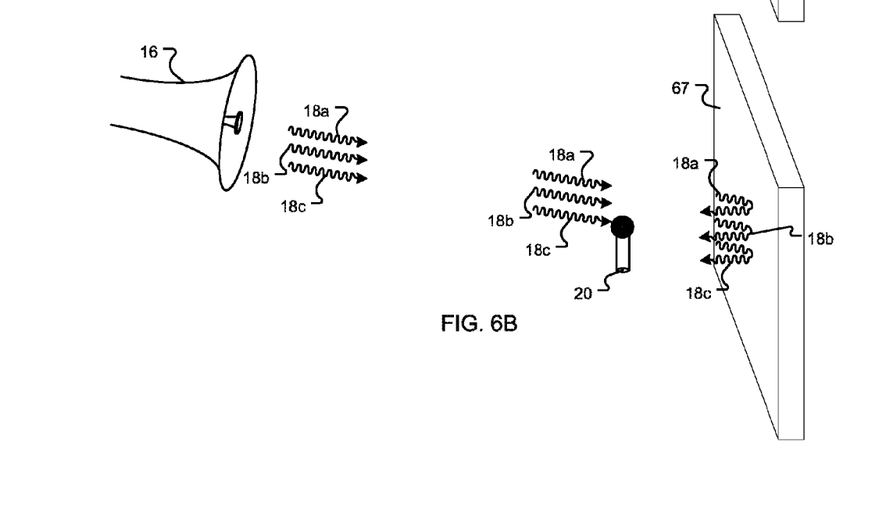

Referring to FIGS. 6A and 6B, concurrently broadcasting several audio signals 18a, 18b, 18c helps reduce the possibility of errors related to echoes as compared to broadcasting a single audio signal 18. In FIG. 6A, a single audio signal 18 is broadcast from a loudspeaker 16; In FIG. 6B, three audio signals 18a, 18b, and 18c are broadcast from a loudspeaker 16. If the signal 18 carries the same information content as the signals 18a, 18b, and 18c, then the signal 18 is three times as long as any individual signal 18a, 18b, or 18c.

An echo-related error may occur when a signal interferes with itself where a microphone 20 is located. In FIG. 6A, for example, the signal 18 reflects off a wall 67, so that both the last portion and the (reflected) initial portion of the signal arrive at the microphone. By contrast, in FIG. 6B when the loudspeaker 16 and microphone 20 are in the same relative positions, there are no echo-related errors, because the signal lengths are sufficiently short.

The higher the frequency of an audio, signal, the shorter its duration needs to be in order to send a certain fixed amount of data. Thus, allocating any extra bits of the resource identifier to higher-frequency channels helps reduce echo-related errors by keeping signals relatively short.

Using a larger resource identifier has the advantage of being able to accommodate more distinct resources, but has the disadvantage of requiring longer audio signals 18, thereby increasing the risk of echo-related error, as described above. In some implementations, the resource identifier 52 consists of an integer with a length between twenty four and thirty bits, which are segmented for transmission across three audio channels and encoded using GMSK modulation. In some implementations, the resource identifier 52 can also include other data, e.g., data describing a geographic or other context to which the resource relates.

Referring back to FIG. 5, if there are any unencoded segments remaining (decision 68), then the encoding process 58 returns back to step 64, where the next unencoded segment is selected. Once all segments have been encoded, process 58 concludes, having produced a number of audio signals that collectively encode the resource identifier.

Although the use of several separate (or substantially separate) audio channels to broadcast several audio signals is advantageous for reasons described herein, these techniques can still be successful with a single audio signal broadcast on a single audio channel.

Figure 7:
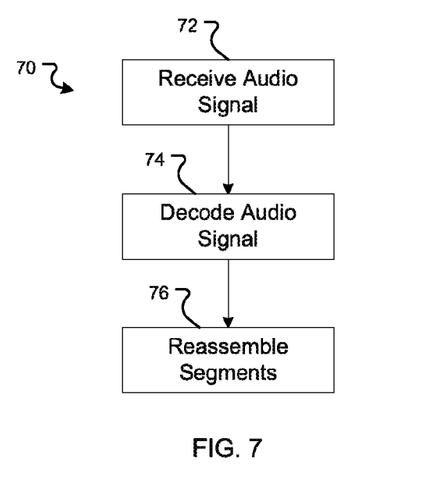
FIG. 7 is a flowchart for decoding a resource identifier.

FIG. 7 is a flowchart for a decoding process. Initially, an audio signal can be received (step 72). For example, the audio signal can be the result of broadcasting step 40 of method 30. The received audio signal can then be decoded (step 74). The decoding process utilizes the compatible techniques of those used to encode the audio signal. For example, if GMSK techniques were used to encode the audio signal, those techniques are used to decode the signal.

Upon decoding the signal, the step 74 produces one or more resource identifier segments. If more than one segment is produced, those segments are subsequently reassembled (step 76), thereby producing a resource identification 52.

Figure 8:
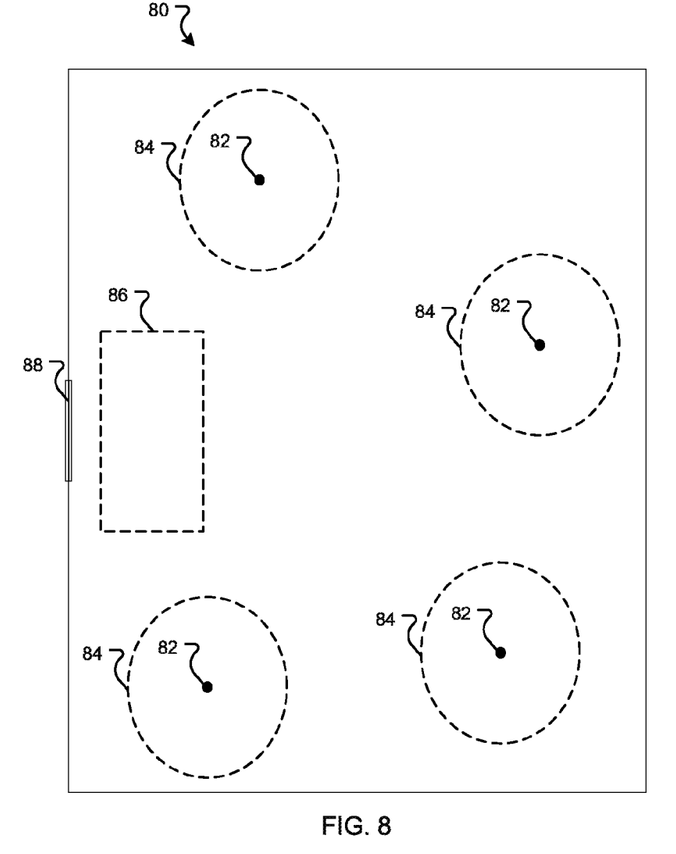
FIG. 8 is a schematic depiction of a venue with several content use sites.

FIG. 8 is a schematic depiction of a venue with several content display points. The venue 80 includes several content display points 82, each with a corresponding effective display area 84. For example, there may be a signaling computer 14 at each display point 82, and each effective display area 84 corresponds to the range of the signaling computer's loudspeaker 16. Other examples are possible.

As a person navigates the venue 80, they encounter the various content display points 82. Each content display point 82 provides a content use cue to cause a user's computer to display content relevant to that particular content display point. For example, the content use cue can include an audio signal 18 as described above. More generally, the content use cue can include any transmission that causes the user's computer to display specific content. For example, the content use cue can include a visual signal, a conventional data transmission over a network connection, etc.

In the foregoing scenario, it is sometimes convenient for the user to have obtained the pertinent content for the various content display points 82 in advance of encountering those display points. To facilitate this, one or more content acquisition sites 86 can be established in the venue 80. For example, a content acquisition site can be established near an entrance 88 of the venue 80.

A content acquisition site 86 can provide a content acquisition cue to a user. For example, the content acquisition cue can include an audio signal 18 as describe above. More generally, the content acquisition cue can include any transmission that causes the user's computer to acquire pertinent content. For example, the content acquisition cue can include a visual signal, a conventional data transmission over a network connection, etc. A content acquisition cue can simply include a verbal instruction to load a particular piece of physical media, such as a DVD, that bears the content pertinent to the content display points 82.

In response to receiving the content acquisition cue, the user's computer acquires the content pertinent to the various content display sites. For example, the user's computer can perform the method 42 of FIG. 3. The user's computer can obtain the content in other ways, such as acquiring the content via a conventional network connection to a local or remote computer, or by loading files from a local storage device.

Acquiring content prior to use can have advantages. For example, having content locally available when receiving a content use cue tends to allow the user's computer to use the content relatively quickly. Moreover, obtaining all the content for the various content use points 82 in the venue 80 in one network transmission can provide power or bandwidth savings over obtaining content from the different content use points 82 on an as-needed basis.

In addition to the example discussed above involving a presenter and audience members at a conference utilizing a resource retrieval system 10 to retrieve visual aides, interactive surveys, and the like, numerous other examples exist.

In one example, the resource retrieval system 10 can be deployed at a retail venue. At various locations near specified products, an audio signal source can be deployed to cause computers that detect the audio signal to retrieve content pertinent to one or more products in the vicinity. Such content can include, e.g., advertisement materials, promotions, coupons, product descriptions, product reviews, links to product-related web sites, etc. Additionally, a store-wide audio signal can be broadcast periodically alerting shoppers to promotions or specials occurring in specified departments or locations in the retail venue.

In another example, the resource retrieval system 10 can be deployed in a museum or other venue amenable to self-guided tours. Near points of interest (e.g., exhibits, historical sites, etc.), the resource retrieval system 10 can be used to cause users' computers to automatically retrieve information about the point of interest. Moreover, different information can be displayed to different users. For example, an "advanced" presentation or a "beginner" presentation can be displayed, depending on the user's preferences.

In another example, the resource retrieval system 10 can be deployed in a sporting event. At various times, the resource retrieval system 10 can be used to cause users' computers to automatically retrieve information pertinent to a particular competitor, a team, a play, etc.

In another example, the resource retrieval system 10 can be deployed in a classroom setting. The teacher can broadcast audio signals to cause students' computers to display specific resources pertinent to a lecture. Similarly, the teacher can broadcast audio signals to cause students' computers to begin or end an examination.

In another example, the resource retrieval system 10 can be deployed in any venue. At various locations, the resource retrieval system 10 can be used to cause users' computers to automatically retrieve information about the venue such as a map of the venue or surrounding areas. For example a loudspeaker can be deployed at information kiosks, orientation booths, entrances to the venue, etc.

In another example, at any venue, the resource retrieval system can be used to cause users' computers to automatically retrieve information about emergency procedures. For example, in the event of an emergency, a venue-wide broadcast can be sounded over the venue's alarm system to alert occupants about the emergency, where the venue-wide broadcast includes an audio signal according to the techniques described above. Emergency procedures can include evacuation routes, first aid information, safety information, etc.

Many of the above systems, devices, methods, processes, and the like may be realized in hardware; software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly, languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In embodiments, disclosed herein are computer program products comprising computer-executable code or computer-usable code that, when executing on one or more computing devices (such as the devices/systems described above), performs any and/or all of the steps described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A method comprising:

receiving a resource identifier including a string of bits that describe a resource location, wherein the resource identifier has a length of at least twenty four bits;

segmenting the resource identifier into at least three parts each including a contiguous segment of the at least twenty four bits;

encoding each of the at least three parts thereby providing at least three encoded parts;

modulating each one of the at least three encoded parts onto one of a plurality of audio channels, each one of the plurality of audio channels having a center frequency greater than about 16 kHz and separated by at least 1.5 kHz from each other one of the plurality of audio channels, thereby providing at least three modulated signals; and concurrently broadcasting, via a loudspeaker, each of the at least three signals.

2. The method of claim 1, wherein the resource includes multimedia content.

3. The method of claim 1, wherein the resource includes source code or executable code.

4. The method of claim 1, wherein the resource location includes a Uniform Resource Locator.

5. The method of claim 1, wherein the resource location includes an Internet Protocol address.

6. The method of claim 1, wherein the resource location includes a path on a storage medium.

7. The method of claim 1, wherein the resource location includes a memory address.

8. The method of claim 1, wherein encoding includes encoding using a Gaussian Minimum Shift Keying technique.

9. The method of claim 1, further comprising identifying a minimum channel size and a total usable bandwidth, wherein the identifier is segmented into a number of parts equal to the total usable bandwidth divided by the minimum channel size.

10. The method of claim 1, wherein the identifier is segmented into three parts.

11. The method of claim 1, wherein the resource identifier includes an integer between 0 and 2^30.

12. The method of claim 11, wherein the resource identifier consists of an integer between 0 and 2^30.

13. The method of claim 1, wherein broadcasting includes transmitting from a presenter to an audience at a presentation.

14. The method of claim 1, wherein broadcasting includes transmitting from a location in a retail venue.

15. The method of claim 1 further comprising receiving and decoding the resource identifier at a client device, thereby causing the device to retrieve a resource from the resource location.

* * * * *